(12) United States Patent
Herron et al.

(10) Patent No.: US 11,954,948 B1
(45) Date of Patent: Apr. 9, 2024

(54) VEHICLE COMMUNICATION INTERFACE CABLE WITH INTEGRATED BATTERY

(71) Applicant: Opus IVS, Inc., Ann Arbor, MI (US)

(72) Inventors: Brian J. Herron, Dexter, MI (US); Mark W. Wine, Ann Arbor, MI (US)

(73) Assignee: Opus IVS, Inc., Dexter, MI (US)

( * ) Notice: Subject to any disclaimer, the term of this patent is extended or adjusted under 35 U.S.C. 154(b) by 678 days.

(21) Appl. No.: 17/139,154

(22) Filed: Dec. 31, 2020

(51) Int. Cl.
 *G07C 5/00* (2006.01)
 *B60R 16/023* (2006.01)
 *B60R 16/04* (2006.01)

(52) U.S. Cl.
 CPC .......... *G07C 5/008* (2013.01); *B60R 16/0238* (2013.01); *B60R 16/04* (2013.01)

(58) Field of Classification Search
 CPC ...... G07C 5/008; B60R 16/0238; B60R 16/04
 See application file for complete search history.

(56) References Cited

U.S. PATENT DOCUMENTS

| | | | | |
|---|---|---|---|---|
| 9,065,107 | B2 * | 6/2015 | Bennett | A61B 18/148 |
| 9,118,057 | B2 * | 8/2015 | Bennett | H01M 50/247 |
| 9,486,268 | B2 * | 11/2016 | Bennett | A61B 18/148 |
| 10,445,953 | B1 * | 10/2019 | Herron | G07C 5/008 |
| 11,508,191 | B1 * | 11/2022 | Herron | G07C 5/0808 |
| 11,538,290 | B1 * | 12/2022 | Herron | G07C 5/0841 |
| 2006/0101311 | A1 * | 5/2006 | Lipscomb | G07C 5/008 714/47.1 |
| 2012/0301762 | A1 * | 11/2012 | Welker | H01M 50/503 429/99 |
| 2013/0197317 | A1 * | 8/2013 | Daniel | A61B 1/0684 600/249 |
| 2015/0236332 | A1 * | 8/2015 | Bennett | H01M 50/593 429/97 |
| 2015/0320474 | A1 * | 11/2015 | Bennett | A61B 18/04 606/41 |
| 2016/0300402 | A1 * | 10/2016 | Nassar | G07C 5/008 |
| 2017/0288357 | A1 * | 10/2017 | Price | B33Y 10/00 |

* cited by examiner

*Primary Examiner* — Jared Fureman
*Assistant Examiner* — Michael J Warmflash
(74) *Attorney, Agent, or Firm* — Gardner, Linn, Burkhart & Ondersma LLP

(57) ABSTRACT

A vehicle communication interface cable includes a vehicle connector having a connector body and configured to connect to a diagnostic port of a vehicle, a vehicle communication interface connector having a connector body and configured to connect to a vehicle communication interface, a flexible cable portion having one or more conductors and extending between the vehicle connector and the vehicle communication interface connector, and a battery module comprising a housing for a battery. The battery module is integrated with the cable portion and a pair of battery wires extend from the housing to the vehicle communication interface connector to provide power to a vehicle communication interface from a battery within the housing when the vehicle communication interface connector is connected to the vehicle communication interface.

16 Claims, 9 Drawing Sheets

VEHICLE COMMUNICATION INTERFACE CABLE WITH INTEGRATED BATTERY

BACKGROUND AND FIELD OF THE INVENTION

The present invention is directed to a vehicle communication interface cable with integrated battery and a vehicle communication interface device with such a cable whereby the vehicle communication device does not require an internal battery.

In automotive repair garages, many of the tools used to diagnose and repair cars have transitioned to computer-based systems. Vehicle diagnostic systems employing diagnostic scan devices or tools are used in automotive repair facilities to diagnose and repair computer-based vehicle systems, where vehicles may have differing computer-based systems depending on the configuration and options installed on the vehicle. The diagnostic systems may employ vehicle communication interface devices that are configured with protocols to enable communication with the electronic control units of the electronic system of the vehicle, including for scanning, diagnosing and/or programming the electronic control units. To perform these operations the vehicle communication interface device is connected to the vehicle by a cable, where one end of the cable is plugged into a port of the vehicle, such as an onboard diagnostic port, and the other end of the cable is plugged into the vehicle communication interface device.

SUMMARY OF THE INVENTION

The present invention provides a vehicle communication interface cable with an integrated battery for connecting a vehicle communication interface device ("VCI") with an electronic system of a vehicle where the battery of the cable is thereby able to provide power to the VCI such that the VCI may not require or include an internal battery. The VCI and cable may thus be used at least for scanning of the electronic system of the vehicle, including such as for scanning the electronic control units of the electronic system for diagnostic trouble codes ("DTCs"), as well as may be used for reprogramming of the electronic system.

An embodiment of a vehicle communication interface cable in accordance with the present invention includes a vehicle connector having a connector body and configured to connect to a diagnostic port of a vehicle, a vehicle communication interface connector having a connector body and configured to connect to a vehicle communication interface, a flexible cable portion having one or more conductors and extending between the vehicle connector and the vehicle communication interface connector, and a battery module comprising a housing for a battery. The battery module is integrated with the cable portion and a pair of battery wires extend from the housing to the vehicle communication interface connector to provide power to a vehicle communication interface from a battery within the housing when the vehicle communication interface connector is connected to the vehicle communication interface.

In a particular embodiment the cable portion comprises a first cable portion and a second cable portion with the first cable portion extending from the vehicle connector to the housing and with the second cable portion extending from the vehicle communication interface connector to the housing, where the conductors extend through the housing and through the first and second cable portions. The housing is formed as a molded plastic portion with the conductors and battery wires encased within the housing. Still further, the housing is configured as an elongate body having opposed ends, with the first cable portion engaged with the housing at one end and the second cable portion engaged with the housing at the other of the ends.

In a further configuration, the housing includes a pair of battery contacts exposed within the cavity for contacting a battery disposed within the cavity, with one of the battery wires being connected to one of the battery contacts and the other battery wire being connected to the other battery contact. The battery module may further include a battery mount disposed within the cavity, and a cover that is selectively attached to the housing to enclose the cavity.

The interface cable may further include a circuit board disposed within the body of the vehicle communication interface connector, where the battery wires extend from the housing and are connected to the circuit board and where the conductors are connected to the circuit board, with the circuit board being operatively connected for data signal communication with a plug portion of the vehicle communication interface connector.

A vehicle communication system in accordance with an embodiment of the present invention includes a vehicle communication interface and a vehicle communication interface cable having opposed ends, wherein the vehicle communication interface cable is selectively coupled to the vehicle communication interface at one end and is selectively coupled to a diagnostic port of a vehicle at the other end. The vehicle communication interface cable includes at one end a vehicle communication interface connector having a connector body and is configured to connect to the vehicle communication interface, and includes a vehicle connector at the other end having a connector body and is configured to connect to a diagnostic port of a vehicle. The vehicle communication interface cable further includes a battery module comprising a housing for a battery, and a cable portion extending between the vehicle connector and the vehicle communication interface connector, where the cable portion is flexible and includes at least one conductor. The battery module is integrated with the cable portion and a pair of battery wires extend from the housing to the vehicle communication interface connector to provide power to the vehicle communication interface from the battery within the housing when the vehicle communication interface connector is connected to the vehicle communication interface such that the vehicle communication interface is operable to diagnose, scan and/or re-program one or more engine control units of the vehicle.

The vehicle communication interface cable with integrated battery is configured for connecting a vehicle communication interface device ("VCI") with an electronic system of a vehicle for diagnostic operations using the VCI such that the battery of the cable is provides power to the VCI whereby the VCI may not require or include an internal battery, thereby avoiding the VCI from requiring battery accessibility features and avoiding any such battery internal to the VCI from being subject to temperatures generated during operation of the VCI, which might otherwise impact the battery life. Still further, the integrated battery of the interface cable is readily accessible, whereas in contrast a VCI with an internal battery may be more difficult to service. Additionally, depending on the intended usage rate of the VCI, variously configured interface cables may be provided for use with variously sized rechargeable batteries to accommodate the intended usage rate of the VCI, whereby a user need not purchase a more expensive longer life battery if it is not required.

DESCRIPTION OF THE PREFERRED EMBODIMENTS

The present invention will now be described with reference to the accompanying figures, wherein the numbered elements in the following written description correspond to like-numbered elements in the figures.

Figure 1:
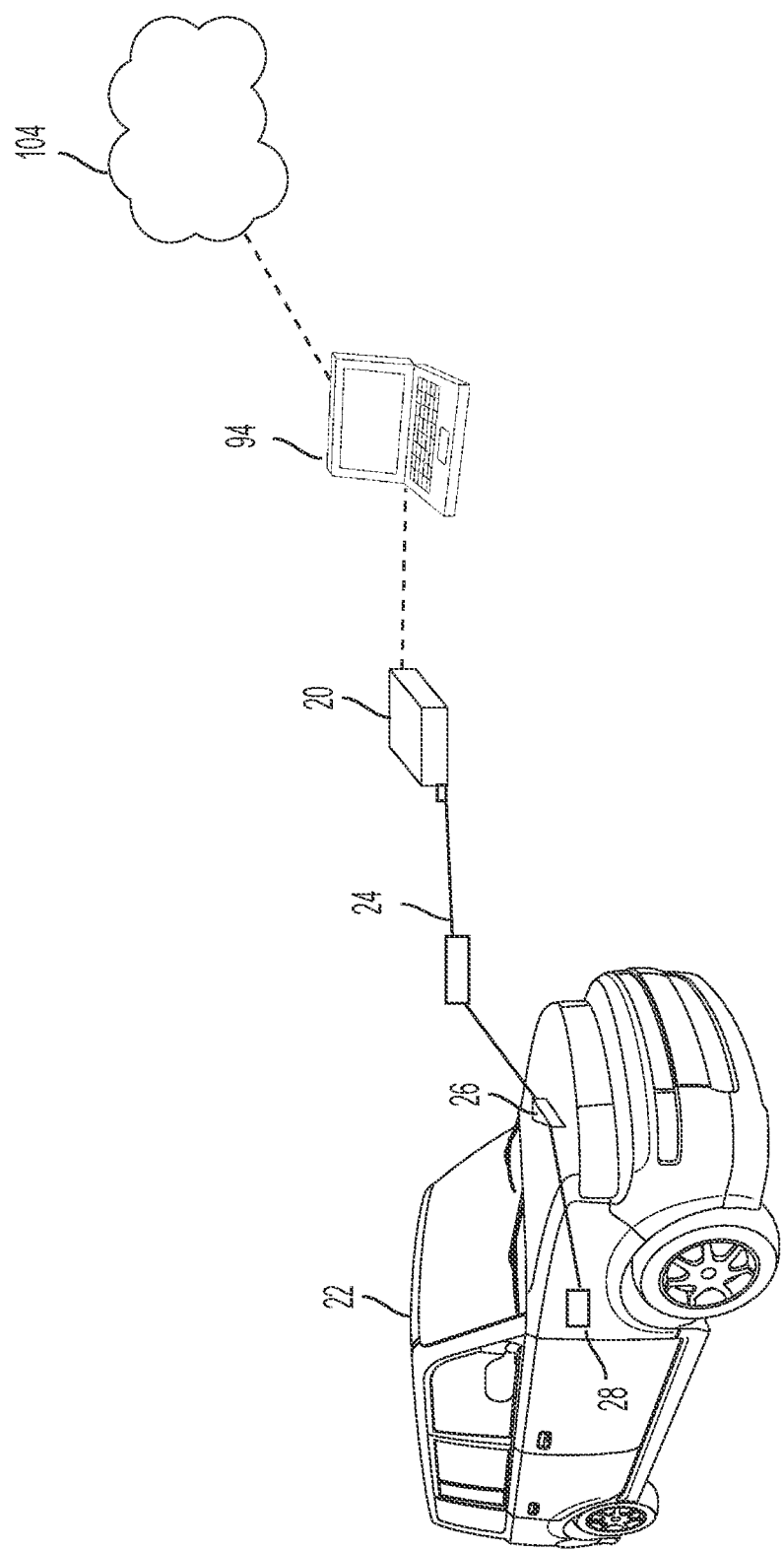
FIG. 1 is a schematic illustration of a vehicle interface cable with integrated battery connecting a vehicle interface device and vehicle in accordance with the present invention.

With reference to FIG. 1, a vehicle communication interface device or tool ("VCI") 20 is shown connected to a vehicle 22 by way of a vehicle interface cable 24 for use by a mechanic or operator in scanning, diagnosing and/or programming vehicle 22. In use, vehicle communication interface device 20 is configured to be connected by interface cable 24 to a diagnostic port 26 of vehicle 22, such as to an onboard diagnostic port ("OBD" or "OBDII" port) whereby the diagnostic device 20 is in communication with the electronic system 28 of vehicle 22. Vehicle communication interface device 20 is thereby operable for use in scanning, diagnosing and/or programing various electronic control units ("ECUs") of electronic system 28, such as an engine ECU 30, body ECU 32, brakes ECU 34, and/or other ECUs 36, and/or other electronic parts and components of vehicle 22 (see FIG. 9). In operation, data signals are exchanged between vehicle communication interface device 20 and electronic system 28 via interface cable 24. In accordance with aspects of the present invention, interface cable 24 includes an integrated battery configured to provide power to VCI 20. Accordingly, in the illustrated embodiment VCI 20 does not include an internal battery, thereby avoiding VCI 20 from requiring battery accessibility features and avoiding any such battery internal to VCI 20 from being subject to temperatures generated during operation of VCI 20, which might otherwise impact the battery life in use of VCI 20. As also discussed in more detail below, the integrated battery of cable 24 is readily accessible, whereas in contrast a VCI with an internal battery may be more difficult to service. Still further, depending on the intended usage rate of VCI 20, variously configured interface cables may be provided for use with variously sized rechargeable batteries to accommodate the intended usage of VCI 20, whereby an operator need not purchase a more expensive longer life battery if it is not required.

Figure 2:
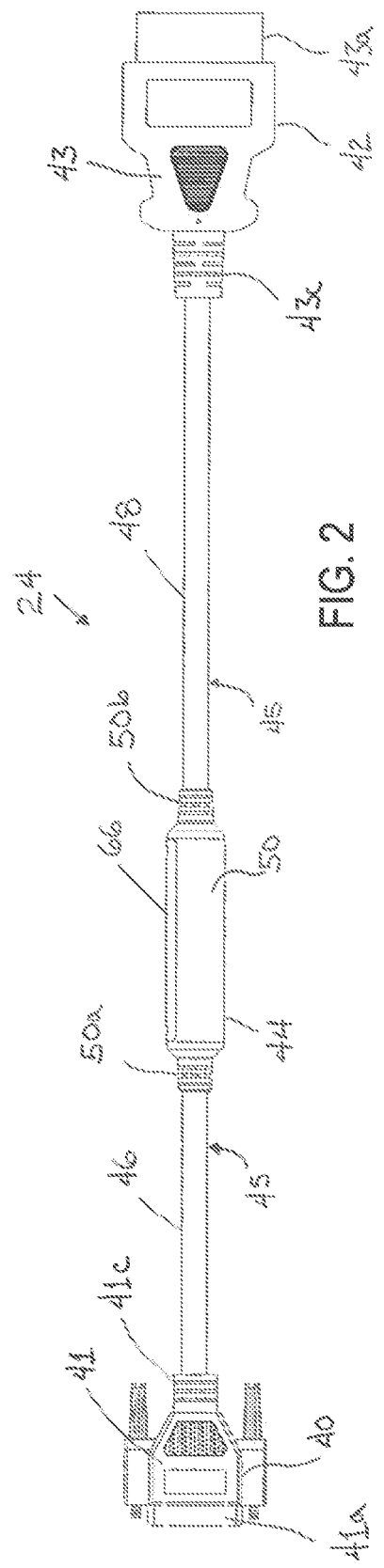
FIG. 2 is a top plan view of the cable of FIG. 1.
Figure 2B:
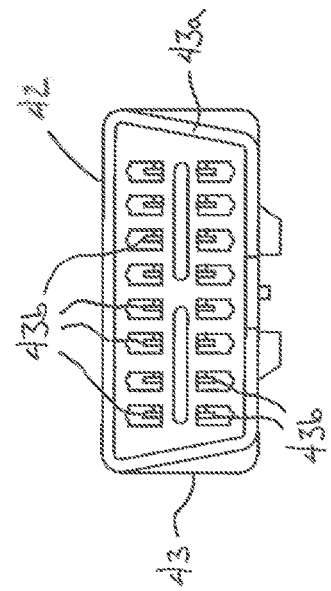
FIGS. 2A and 2B are end views of the respective connector ends of the cable of FIG. 2.
Figure 2C:
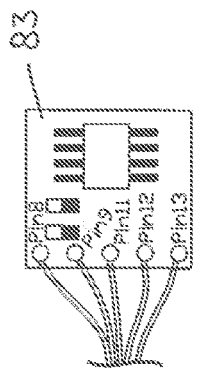
FIG. 2C is a top plan view of an internal circuit board of a connector of the cable of FIG. 2.
Figure 2A:
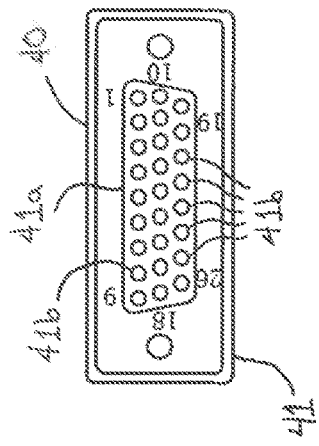
Figure 3:
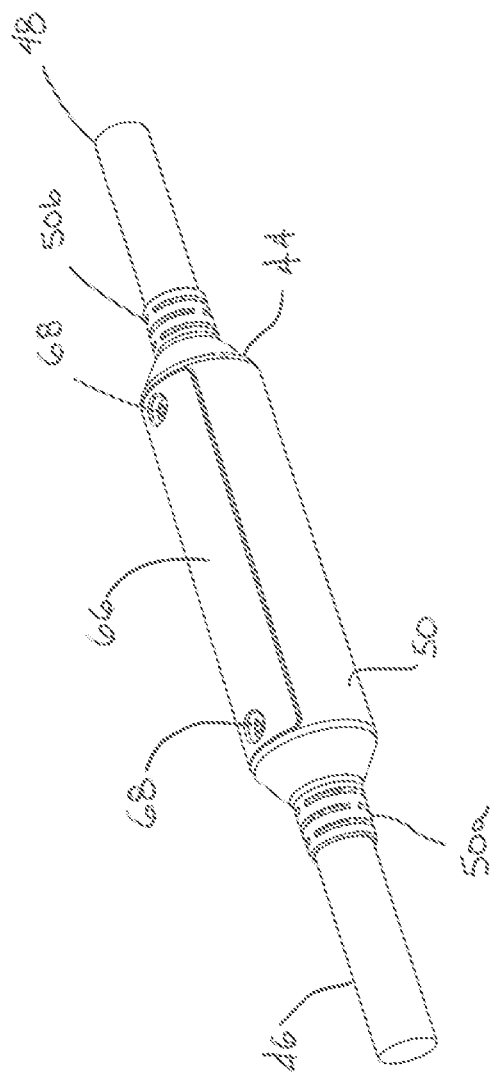
FIG. 3 is a partial perspective view of the cable of FIG. 2 illustrating a battery module of the cable.

With initial reference to FIGS. 2, 2A and 2B, interface cable 24 includes a pair of connectors 40, 42 at opposed ends of cable 24 for connecting to a port or connector 38 on VCI 20 (see FIG. 8) and the vehicle diagnostic port 26 of vehicle 22, respectively. As illustrated, cable 24 additionally includes a battery module or enclosure 44 disposed along and integrated or connected with a flexible cable 45 between connectors 40, 42, where in the illustrated embodiment the flexible cable 45 comprises a flexible first cable portion 46 extending between connector 40 and battery module 44 and a flexible second cable portion 48 extending between connector 42 and battery module 44. In the illustrated embodiment, connector 40 of cable 24 includes a connector body or housing 41 with a plug or receptacle 41a and is configured as a female HDB26 connector for receipt at pin receptacles 41b of the twenty-six pins 38a of connector 38 of VCI 20, with connector body 41 including conventional threaded fasteners for securing to connector 38. First cable portion 46 is connected with connector body 41 at a flexible molded joint or receptacle 41c that is formed with connector body 41. Connector 42 of cable 24 includes a body or housing 43 and is configured as a plug-in sixteen pin connector for plugging plug 43a into port 26 of vehicle 22, where plug 43a includes pins 43b for engaging with the port 26. As shown, second cable portion 48 is connected with connector body 43 at a flexible molded joint or receptacle 43c that is formed with connector body 43.

Battery module 42 will now be discussed in more detail with reference to FIGS. 3-7. As there shown, battery module 42 includes a molded housing 50 having an internal cavity 52 within which a battery cradle or support or mount 54 is disposed for receiving and holding a battery 56, such as a rechargeable battery. In the illustrated embodiment housing 50 is molded from PVC and includes opposed molded flexible end or joint portions 50a, 50b for engaging with and providing relief support to ends of first cable portion 46 and second cable portion 48. A pair of battery contacts 58, 60 are affixed to battery mount 54, where contact 58 includes a spring 62 for engaging with a negative end or terminal of battery 56 and contact 60 includes a projection 64 configured to engage with the positive end or terminal of battery 56. A lid or cover 66 is used to enclose battery 56 within cavity 52 via fasteners 68.

Figure 4:
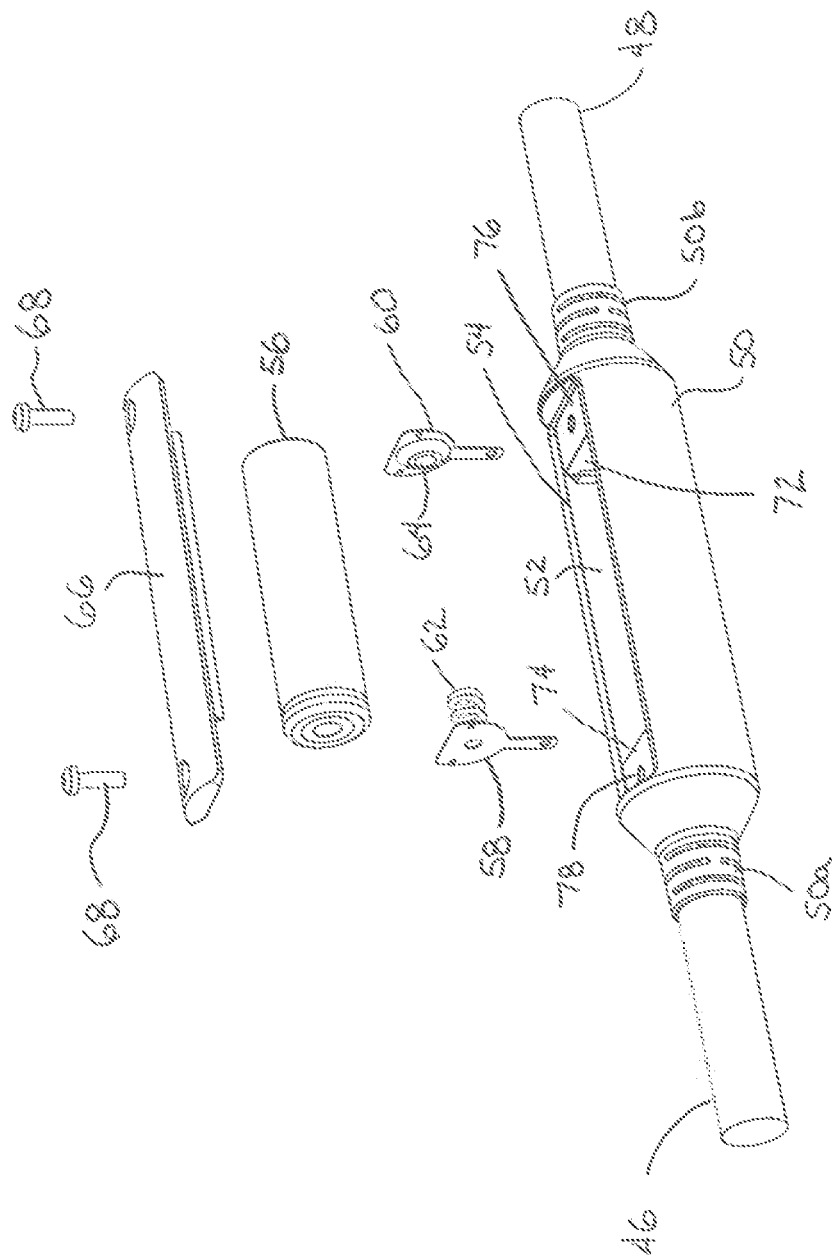
FIG. 4 is an exploded perspective view of the battery module of FIG. 3.
Figure 5:
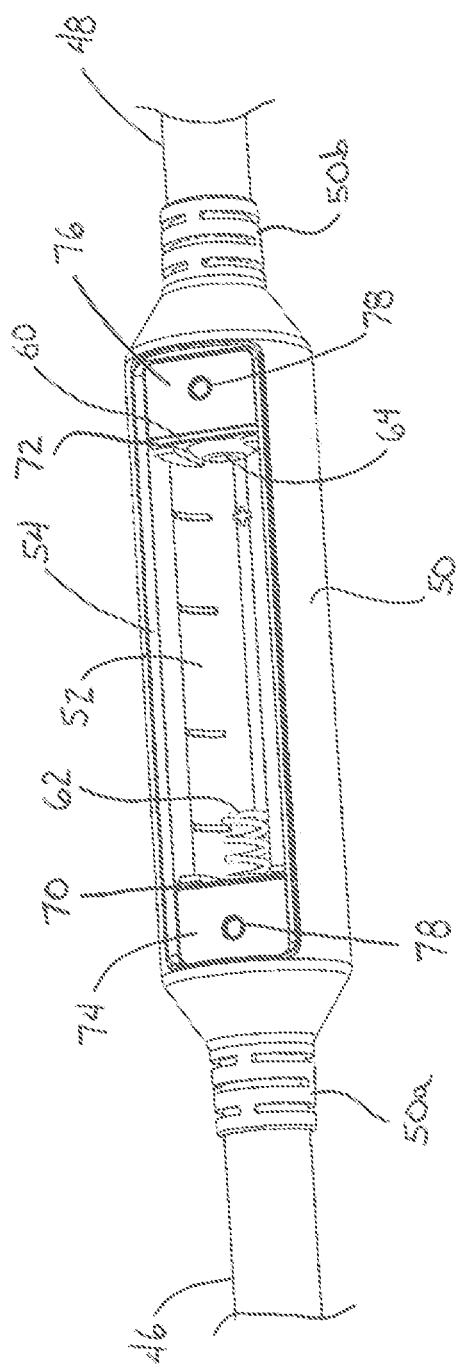
FIG. 5 is a partial interior perspective view of the battery module of FIG. 3.
Figure 6:
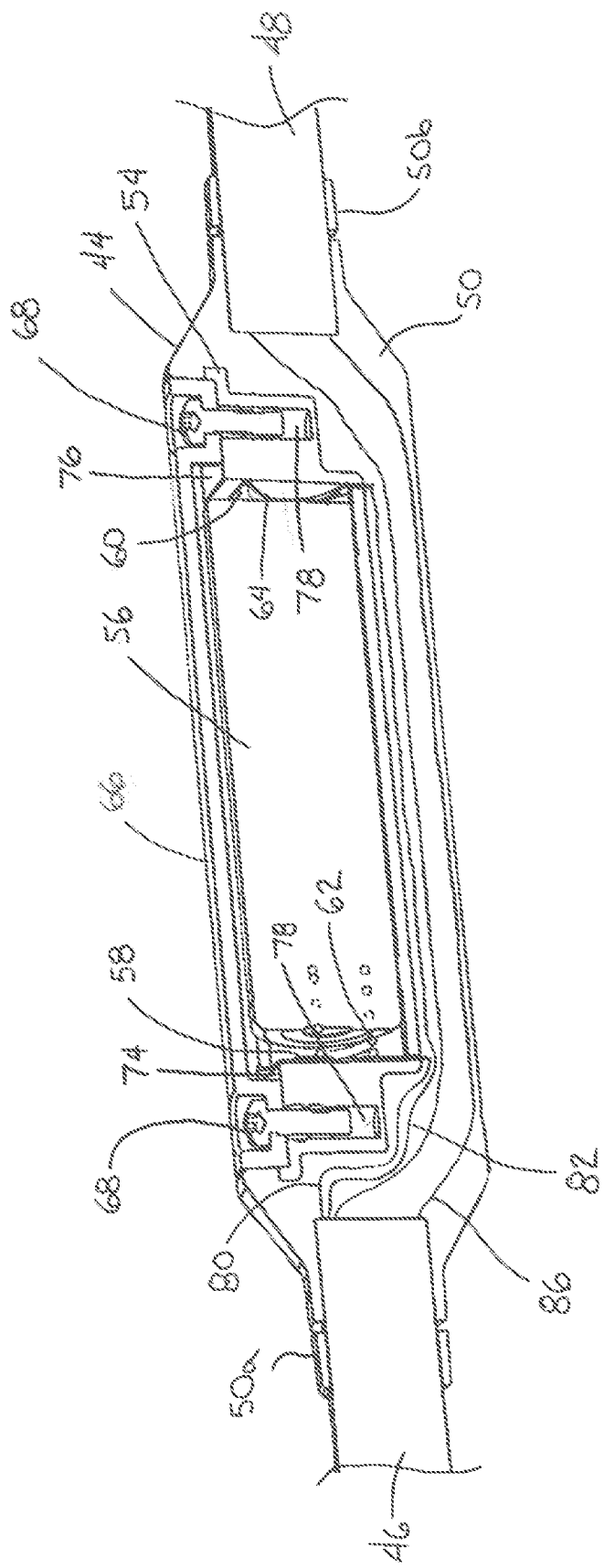
FIG. 6 is a side cross-sectional perspective view of the battery module of FIG. 3 illustrating internal wiring.

As best understood from FIGS. 4-6, battery mount 54 includes a receptacle 70, 72 at each end for receiving and retaining a respective contact 58, 60. Each receptacle 70, 72 comprises a wall that is spaced away from a respective platform 74, 76 whereby the contacts 58, 60 may be slid between the wall of the receptacle 70, 72 and the platforms 74, 76, and with each wall of the receptacle 70, 72 including a central opening through which the respective spring 62 and projection 64 extend for engaging with the battery 56. The platforms 74, 76 additionally support the ends of the battery cover 66 when attached, with each platform 74, 76 including a threaded hole 78 for receiving a fastener 68.

The internal wiring of cable 24 relative to battery module 44 will now be discussed with reference to FIGS. 6 and 7. As shown in FIG. 6, a pair of battery cables or wires 80, 82 extend through and from first cable portion 46 so as to engage at one end with contacts 58, 60, respectively. The opposite ends of battery wires 80, 82 are connected with connector 40 whereby power is supplied by battery 56 to VCI 20 via selected pin connections of connector 40 and connector 38 of VCI 20. For example, the ends of wires 80, 82 opposite from battery module 44 may connect with a circuit board 83 contained within the connector body 41 of connector 40, where the circuit board in turn has wired connections to the pin receptacles 41b of connector 40. Similarly, connector body 43 of connector 42 includes an internal circuit board for receiving conductors within the flexible cable 45. Wires 80, 82 may be configured as coated insulated wire and, as noted, extends along the length of cable portion 46.

Vehicle interface cable 24 thus is configured to provide power to VCI 20 via battery module 44. In particular, battery 56 of battery module 42 provides DC current via battery wires 80, 82 and connector 40 to VCI 20 at port 38. In addition to battery wires 80, 82, cable portion 46 includes additional wires, such as contained within a wire bundle 86, where the wire bundle 86 includes an outer sheathing and multiple separate individual conductors or wires 88 (FIG. 7) and passes through housing 50 and to and through cable portion 48 whereby the wires 88 within bundle 86 are connected to connectors 40, 42, whereby wires 88 are used to transmit data signals to and from VCI 20 and electronic system 28 of vehicle 22.

In the illustrated embodiment, cable portions 46 and 48 are configured as UL2464 multi-conductor cables with 22 AWG insulated conductor wires and an outer PVC jacket surrounding wire bundle 86. It should be appreciated, however, that alternative cable and wire configurations may be employed within the scope of the present invention. For example, in the illustrated embodiment, battery wires 80, 82 are shown as separate wires relative to the wires 88 contained within bundle 86, alternatively, however, battery wires 80, 82 may be wires from bundle 86 and/or bundle 86 need not include a sheathing, and/or the conductor wires may be differently sized.

Figure 7:
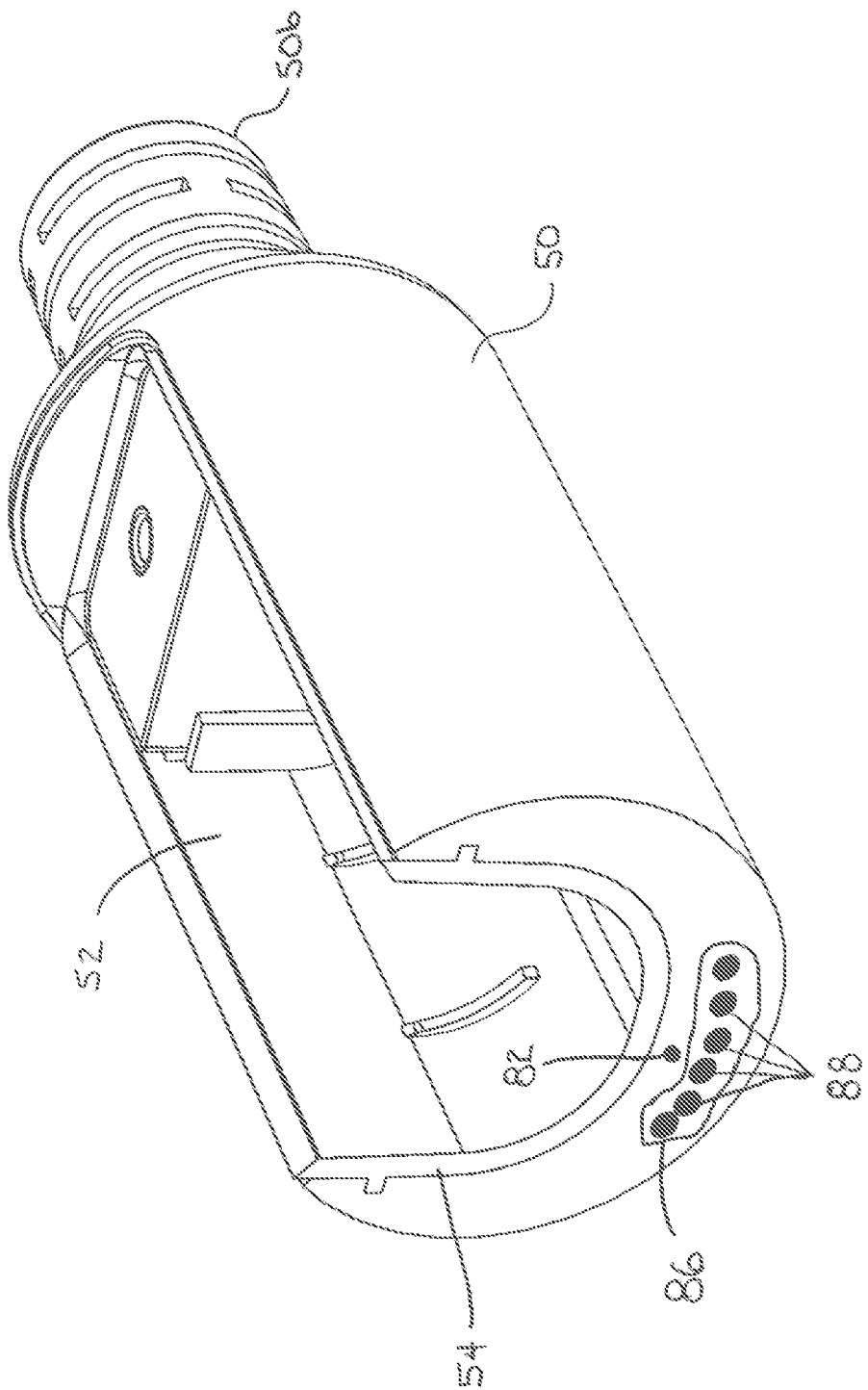
FIG. 7 is a partial cross-sectional perspective view through the length of the battery module of FIG. 3 illustrating internal wiring.

As noted, and understood from FIGS. 6 and 7, wire bundle 86 passes through housing 50 beneath cavity 52, with housing 50 being over molded to the ends of cable portions 46, 48 and over bundle 86. In particular, housing 50 is molded about battery mount 54 with contacts 58, 60 extending through openings in the base of battery mount 54 and battery wires 80, 82 connected to contacts 58, 60. Housing 50 and the other components of battery module 44 may be constructed of a flame retardant material, such as to inhibit effects of any lithium battery fire.

Figure 8:
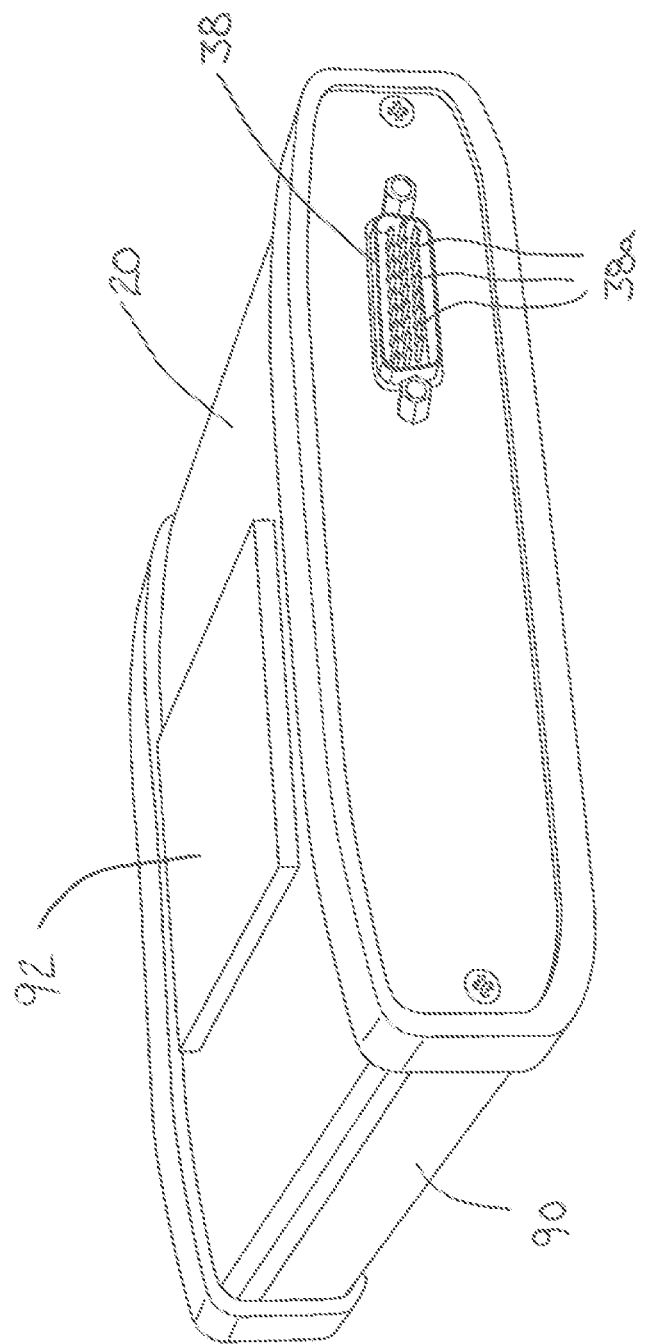
FIG. 8 is a perspective view of the vehicle interface device of FIG. 1.

Wires 88 of bundle 86 are able to convey data signals between VCI 20 and the vehicle electronic system 28. An exemplary VCI 20 is shown in FIG. 8 and, in addition to connector 38, includes a housing 90 and a display screen 92, such as a touchscreen, for interfacing with VCI 20. VCI 20 may be variously configured and constructed, and may be used as a standalone device, such as for diagnostic evaluations, or may be configured for further interfacing with a computer, such as computer 94 shown in FIG. 1, for additional operations.

Figure 9:
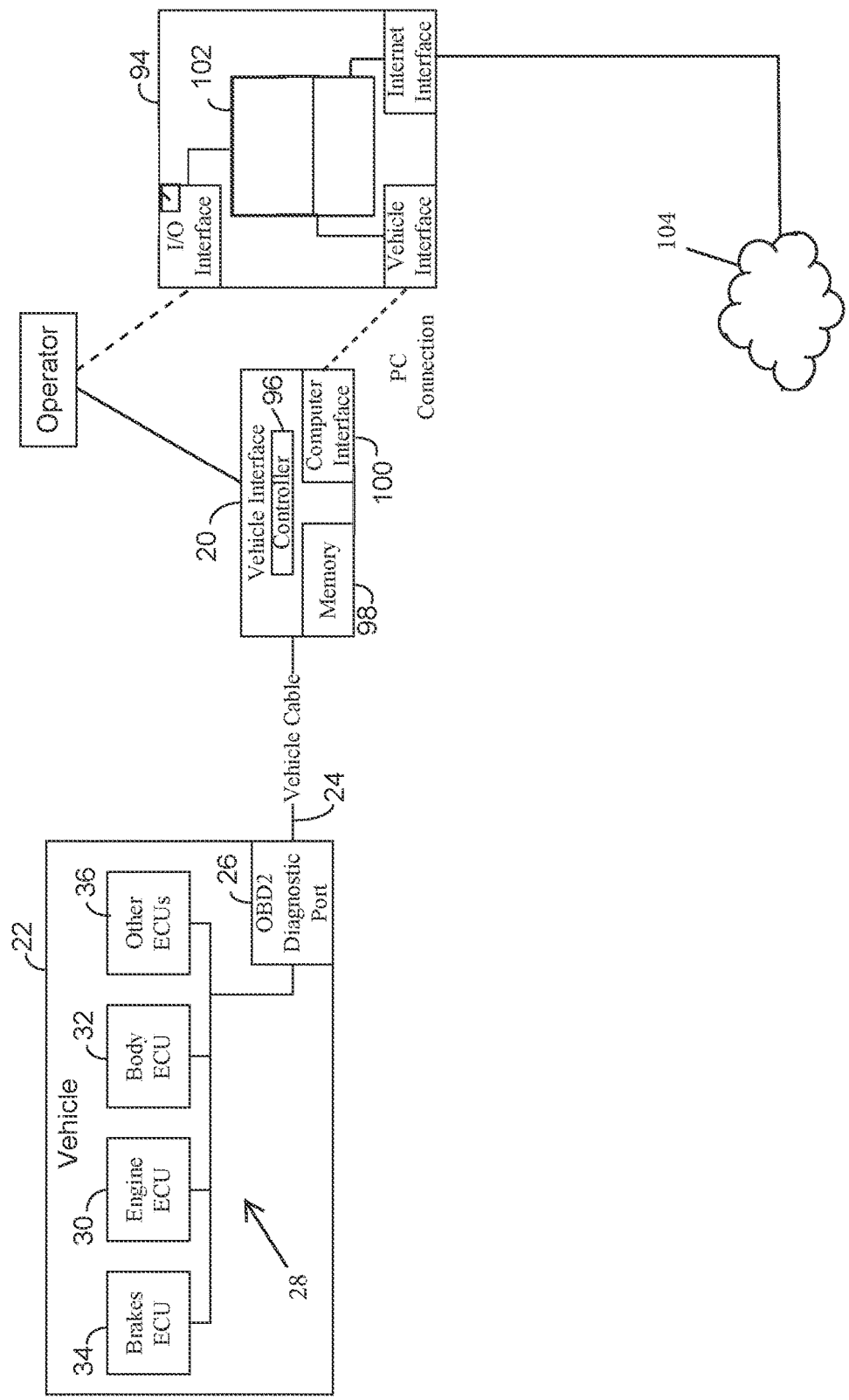
FIG. 9 is an exemplary schematic illustration of a vehicle interface cable connected with an electronic system of a vehicle via the vehicle interface cable of FIG. 1.

In the illustrated embodiment, with further reference to FIG. 9, VCI 20 is illustrated with cable 24 operatively in communication with port 38 and includes a controller 96, such as in the form of a processor or micro-processor and interface circuitry to facilitate communication between the ECUs and the VCI 20, with VCI 20 including a database of vehicle protocols found in a local memory 98 that allow communication with the ECUs of various makes and models of vehicles. Controller 96 may additionally support and enable the processing of various software programs of VCI 20, including for operation of the hardware components of VCI 20. It should be appreciated that controller 96 may comprise one or more processors. In the illustrated embodiment the VCI 20 includes a vehicle communication protocol operating in accordance with the SAE J2534 standard, although additional or alternative protocols may be employed. In an alternative configuration, VCI 20 may also include a computer interface 100, such as for connection with a local computer 94, such as via standard interfaces, such as USB, Bluetooth, Wi-Fi, or the like. VCI 20 may include additional ports or connectors, including USB, Ethernet and other such connectors. The hardware and software of VCI 20 thus enables communication between VCI 20 and the electronic system 28 of vehicle 22.

In an embodiment in which VCI 20 further interfaces with a computer 94, such as a laptop, as also understood from FIG. 9, computer 94 may include a database 102 of one or more diagnostic software scanning programs or applications, such as applications developed by an original equipment automotive manufacturer ("OEM"), or an aftermarket diagnostic company. The diagnostic software scanning programs may be used to diagnose, scan and/or program the electronic system of a vehicle. Alternatively and/or additionally, computer 94 may be configured to establish a remote connection, such as via an Internet connection 104, for accessing a database of diagnostic applications provided by an OEM or third party supplier for use in diagnosing, scanning and/or programing the electronic system 28 of vehicle 22.

The present invention thus provides an interface cable 24 that includes an integrated battery 56 configured to provide power to VCI 20. Accordingly, VCI 20 in the illustrated embodiment does not include an internal battery, thus simplifying the construction of VCI 20 by thereby avoiding battery accessibility features and avoiding any such battery internal to VCI 20 from being subject to temperatures generated during operation of VCI 20, which might otherwise impact the battery life in use of VCI 20. The integrated battery 56 of cable 24 is readily accessible via cover 66 of battery module 44. In contrast a VCI with an internal battery may be more difficult to service. Still further, variously configured interface cables 24 may be provided for use with variously sized rechargeable batteries 56, such as to accommodate varying usages of VCI 20, whereby a user need not purchase a more expensive longer life battery if it is not required. It should be appreciated that cable 24 may also be constructed in various lengths. Still further, although battery module 44 is shown as being centrally located between connectors 40 and 42, the battery module may be alternatively located along the length of the cable, including for example being positioned adjacent connector 40, whereby only a single flexible cable portion may be required. Moreover, it should be further appreciated that connectors 40 and 42 may be alternatively configured, such as with an alternative number of pins or pin receptacles, and/or to be male instead of female or vice versa.

Other changes and modifications in the specifically described embodiments can be carried out without departing from the principles of the present invention which is intended to be limited only by the scope of the appended claims, as interpreted according to the principles of patent law including the doctrine of equivalents.

The invention claimed is:
1. A vehicle communication interface cable comprising:
   a vehicle connector having a connector body and configured to connect to a diagnostic port of a vehicle;
   a vehicle communication interface connector having a connector body and configured to connect to a vehicle communication interface;
   a battery module comprising a housing for a battery; and a cable portion extending between said vehicle connector and said vehicle communication interface connector, wherein said cable portion is flexible and comprises at least one conductor;

wherein said battery module is integrated with said cable portion, and wherein a pair of battery wires extend from said housing to said vehicle communication interface connector to provide power to a vehicle communication interface from a battery within said housing when said vehicle communication interface connector is connected to the vehicle communication interface.

2. The vehicle communication interface cable of claim 1, wherein said cable portion comprises a first cable portion and a second cable portion with said first cable portion extending from said vehicle connector to said housing and with said second cable portion extending from said vehicle communication interface connector to said housing, and wherein said at least one conductor extends through said housing and through said first cable portion and said second cable portion.

3. The vehicle communication interface cable of claim 2, wherein said housing comprises molded plastic with said at least one conductor encased in said housing.

4. The vehicle communication interface cable of claim 3, wherein said battery wires are encased within said housing.

5. The vehicle communication interface cable of claim 2, wherein said housing comprises an elongate body having opposed ends, with said first cable portion engaged with said housing at one of said ends and said second cable portion engaged with said housing at the other of said ends.

6. The vehicle communication interface cable of claim 1, wherein said housing includes a pair of battery contacts exposed within said cavity for contacting a battery disposed within said cavity, and wherein one of said battery wires is connected to one said battery contact and the other said battery wire is connected to the other said battery contact.

7. The vehicle communication interface cable of claim 6, wherein said battery module further comprises a battery mount disposed within said cavity.

8. The vehicle communication interface cable of claim 6, wherein said battery module further comprises a cover that is selectively attached to said housing to enclose said cavity.

9. The vehicle communication interface cable of claim 1, wherein a circuit board is disposed within said body of said vehicle communication interface connector, wherein said battery wires extend from said housing and are connected to said circuit board and wherein said at least one conductor is connected to said circuit board, and wherein said circuit board is operatively connected for data signal communication with a plug portion of said vehicle communication interface connector.

10. A vehicle communication system, said system comprising:

a vehicle communication interface cable having opposed ends and a vehicle communication interface, wherein said vehicle communication interface cable is selectively coupled to said vehicle communication interface at one end and is selectively coupled to a diagnostic port of a vehicle at the other end;

said vehicle communication interface cable comprising at one end a vehicle communication interface connector having a connector body and configured to connect to said vehicle communication interface, and comprising a vehicle connector at the other end having a connector body and configured to connect to a diagnostic port of a vehicle, said vehicle communication interface cable further comprising a battery module comprising a housing for a battery, and a cable portion extending between said vehicle connector and said vehicle communication interface connector, wherein said cable portion is flexible and comprises at least one conductor;

wherein said battery module is integrated with said cable portion, and wherein a pair of battery wires extend from said housing to said vehicle communication interface connector to provide power to said vehicle communication interface from said battery within said housing when said vehicle communication interface connector is connected to said vehicle communication interface such that said vehicle communication interface is operable to diagnose, scan and/or re-program one or more engine control units of the vehicle.

11. The vehicle communication system of claim 10, wherein said cable portion comprises a first cable portion and a second cable portion with said first cable portion extending from said vehicle connector to said housing and with said second cable portion extending from said vehicle communication interface connector to said housing, and wherein said at least one conductor extends through said housing and through said first cable portion and said second cable portion.

12. The vehicle communication system of claim 11, wherein said housing comprises molded plastic with said at least one conductor encased in said housing.

13. The vehicle communication system of claim 12, wherein said battery wires are encased within said housing.

14. The vehicle communication system of claim 11, wherein said housing comprises an elongate body having opposed body ends, with said first cable portion engaged with said housing at one of said body ends and said second cable portion engaged with said housing at the other of said body ends.

15. The vehicle communication system of claim 10, wherein said housing includes a pair of battery contacts exposed within said cavity for contacting said battery disposed within said cavity, and wherein one of said battery wires is connected to one said battery contact and the other said battery wire is connected to the other said battery contact.

16. The vehicle communication system of claim 10, wherein a circuit board is disposed within said body of said vehicle communication interface connector, wherein said battery wires extend from said housing and are connected to said circuit board and wherein said at least one conductor is connected to said circuit board, and wherein said circuit board is operatively connected for data signal communication with a plug portion of said vehicle communication interface connector.

\* \* \* \* \*